(12) United States Patent
Ohno

(10) Patent No.: US 8,854,280 B2
(45) Date of Patent: Oct. 7, 2014

(54) IMAGE PROCESSING APPARATUS, IMAGE PROCESSING METHOD, AND PROGRAM

(75) Inventor: Takenori Ohno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1039 days.

(21) Appl. No.: 12/498,273

(22) Filed: Jul. 6, 2009

(65) Prior Publication Data

US 2010/0007799 A1    Jan. 14, 2010

(30) Foreign Application Priority Data

Jul. 10, 2008   (JP) ................................. 2008-180225

(51) Int. Cl.
*G09G 5/00* (2006.01)
*H04N 5/04* (2006.01)
*H04N 9/44* (2006.01)
*H04N 9/69* (2006.01)
*H04N 7/01* (2006.01)

(52) U.S. Cl.
CPC . *H04N 9/44* (2013.01); *H04N 5/04* (2013.01); *H04N 7/0127* (2013.01); *H04N 9/69* (2013.01)
USPC ............ 345/3.2; 345/589; 345/600; 345/604; 345/214

(58) Field of Classification Search
None
See application file for complete search history.

(56) References Cited

U.S. PATENT DOCUMENTS

| 6,295,095 B1 * | 9/2001 | Kawabata et al. ............ 348/576 |
| 7,314,283 B2 * | 1/2008 | Tsukada ....................... 353/121 |
| 7,633,550 B1 * | 12/2009 | Starr et al. .................... 348/497 |
| 7,956,928 B2 * | 6/2011 | Lee et al. ...................... 348/452 |

FOREIGN PATENT DOCUMENTS

| JP | 2003-108103 A | 4/2003 |
| JP | 2005-184586 A | 7/2005 |

OTHER PUBLICATIONS

Bruce Fraser, Chris Murphy, Fred Bunting, 2005, "Color Management—Riron to Jissen (Color Management—Theory and Practice)", Kabushiki-gaisha Vanfu, pp. 81 to 85.

* cited by examiner

*Primary Examiner* — Antonio A Caschera
(74) *Attorney, Agent, or Firm* — Canon U.S.A., Inc. IP Division

(57) ABSTRACT

An image processing apparatus acquires a time interval which is set in a display apparatus and at which the display screen is updated, determines a profile used for a color correction process based on the acquired time interval, and performs the color correction process using the determined profile to an input video signal.

19 Claims, 9 Drawing Sheets

FIG. 7

| X | Y | Z | R | G | B |
|---|---|---|---|---|---|
| 0 | 0 | 0 | 0 | 0 | 0 |
| 1 | 1 | 1 | 16 | 16 | 16 |
| 2 | 2 | 3 | 32 | 32 | 32 |
| 5 | 5 | 8 | 48 | 48 | 48 |
| 10 | 10 | 15 | 64 | 64 | 64 |
| 15 | 15 | 25 | 80 | 80 | 80 |
| 25 | 25 | 40 | 96 | 96 | 96 |
| 40 | 40 | 60 | 112 | 112 | 112 |
| 50 | 50 | 80 | 128 | 128 | 128 |
| 60 | 60 | 100 | 144 | 144 | 144 |
| 80 | 80 | 120 | 160 | 160 | 160 |
| 100 | 100 | 170 | 176 | 176 | 176 |
| 120 | 120 | 200 | 192 | 192 | 192 |
| 150 | 150 | 230 | 208 | 208 | 208 |
| 180 | 180 | 280 | 224 | 224 | 224 |
| 200 | 200 | 300 | 240 | 240 | 240 |
| 230 | 230 | 400 | 255 | 255 | 255 |
| 0 | 0 | 0 | 0 | 0 | 0 |
| 0 | 0 | 0 | 16 | 0 | 0 |
| 1 | 0 | 0 | 32 | 0 | 0 |
|  |  |  |  |  |  |
|  |  |  |  |  |  |
| ⋮ | ⋮ | ⋮ | ⋮ | ⋮ | ⋮ | ns
IMAGE PROCESSING APPARATUS, IMAGE PROCESSING METHOD, AND PROGRAM

BACKGROUND OF THE INVENTION

1. Field of the Invention

The present invention relates to an image processing method used in display of a video image in a display apparatus capable of setting a vertical synchronizing frequency (a time interval at which the display screen is updated).

2. Description of the Related Art

Different devices including a monitor display, an inkjet printer, and an offset printer have different color reproduction ranges. Accordingly, color management systems (hereinafter referred to as CMSs) are proposed, which perform color management so that reproduced video images do not have different colors in different devices (for example, refer to Bruce Fraser, Chris Murphy, Fred Bunting, 2005, "Color Management—Riron to Jissen (Color Management—Theory and Practice)", Kabushiki-gaisha Vanfu, pp. 81 to 85).

The CMS converts the color space so that RGB values or CMYK values transmitted from a video input device (for example, a camera) are reproduced in the same colors in any display apparatus (for example, a display device).

However, the luminance and color of a video image can be varied depending on a vertical synchronizing frequency set in the display apparatus.

The vertical synchronizing frequency represents the number of times a display device updates (rewrites) the display screen per second. The vertical synchronizing frequency is also called a vertical scanning frequency or a refresh rate and is represented in hertz. In other words, the luminance and color on a display screen can possibly be varied depending on the time interval at which the display apparatus updates the display screen. For example, the vertical synchronizing frequency set for the display apparatus can be used to vary the time interval at which the display screen is updated.

FIG. 9 is a graph showing an example of the relationship between the luminance and the gradation when video images are displayed in a cathode ray tube (CRT) display in response to the same video signal at two different vertical synchronizing frequencies. A line A in FIG. 9 shows the luminance relative to the gradation when the vertical synchronizing frequency is equal to 60 Hz. A line B in FIG. 9 shows the luminance relative to the gradation when the vertical synchronizing frequency is equal to 120 Hz.

As shown in FIG. 9, the luminance of a video image can be varied depending on the vertical synchronizing frequency.

FIG. 10 shows Lab values on an a-b plane, which are measured when video images are displayed in a CRT display in response to the same video signal at the vertical synchronizing frequencies shown by the lines A and B in FIG. 9. As shown in FIG. 10, the a-b value of a reproduced video image can be varied depending on the vertical synchronizing frequency.

As described above, a video image can be reproduced in different colors and luminances at different vertical synchronizing frequencies (time intervals at which the display screen is updated) of the display apparatus.

SUMMARY OF THE INVENTION

In order to resolve the above problem, the present invention provides an image processing apparatus, a image processing method, and a program that are capable of reducing the variation of a video image due to different vertical synchronizing frequencies (time intervals at which a display screen is updated).

According to an embodiment of the present invention, an image processing apparatus that performs color correction process to a video signal and transmits the video signal subjected to the color correction process to a display apparatus capable of setting a time interval at which a display screen is updated includes an acquiring unit configured to acquire the time interval at which the display screen is updated; a determining unit configured to determine a profile used for the color correction process based on the acquired time interval; and a processing unit configured to perform the color correction process using the determined profile to the video signal.

According to another embodiment of the present invention, an image processing apparatus that performs color correction process to a video signal and transmits the video signal subjected to the color correction process to a display apparatus capable of setting a time interval at which a display screen is updated includes an acquiring unit configured to acquire a first time interval which is set in the display apparatus and at which the display screen is updated; a storage unit configured to store a profile used for the color correction process for a video signal for displaying a video image in the display apparatus updating the display screen at a second time interval; a converting unit configured to convert the video signal for displaying a video image in the display apparatus updating the display screen at the second time interval if the first time interval is different from the second time interval; and a processing unit configured to perform the color correction process using the profile to the video signal converted by the converting unit and to transmit the video signal subjected to the color correction process to the display apparatus updating the display screen at the first time interval to display a first video image in the display apparatus. The converting unit converts the video signal so that the difference between the first video image and a second video image becomes smaller than the difference between the second video image and a third video image and supplies the video signal resulting from the conversion to the processing unit displaying the first video image. The second video image results from the color correction process using the profile used for displaying a video image in the display apparatus updating the display screen at the second time interval for a video signal that is not converted and is displayed in the display apparatus updating the display screen at the second time interval. The third video image results from the color correction process using the profile used for displaying a video image in the display apparatus updating the display screen at the second time interval for a video signal that is not converted and is displayed in the display apparatus updating the display screen at the first time interval.

According to another embodiment of the present invention, an image processing apparatus that performs color correction process to a video signal and transmits the video signal subjected to the color correction process to a display apparatus capable of setting a time interval at which a display screen is updated includes an acquiring unit configured to acquire a first time interval which is set in the display apparatus and at which the display screen is updated; a storage unit configured to store a first profile used for displaying a video image in the display apparatus updating the display screen at a second time interval; a signal converting unit configured to convert a video signal that is input to display a video image in the display apparatus updating the display screen at the second time interval into a video signal for displaying a video image in the display apparatus updating the display screen at the first time interval if the first time interval is different from the second time interval; a profile converting unit configured to convert the first profile into a second profile used for displaying a video image in the display apparatus updating the display screen at the first time interval different from the second time interval; and a processing unit configured to perform the color correction process using the second profile to the video signal for displaying a video image in the display apparatus updating the display screen at the first time interval and to transmit the video signal subjected to the color correction process to the display apparatus updating the display screen at the first time interval to display a first video image in the display apparatus. The profile converting unit converts the first profile into the second profile so that the difference between the first video image and a second video image becomes smaller than the difference between the second video image and a third video image. The second video image results from the color correction process using the first profile to an input video signal for displaying a video image in the display apparatus updating the display screen at the second time interval and is displayed in the display apparatus updating the display screen at the second time interval. The third video image results from the color correction process using the first profile to an input video signal for displaying a video image in the display apparatus updating the display screen at the second time interval and is displayed in the display apparatus updating the display screen at the first time interval.

According to another embodiment of the present invention, an image processing method for an image processing apparatus that performs color correction process to a video signal and transmits the video signal subjected to the color correction process to a display apparatus capable of setting a time interval at which a display screen is updated includes acquiring the time interval at which the display screen is updated; determining a profile used for the color correction process based on the acquired time interval; and performing the color correction process using the determined profile to the video signal.

According to another embodiment of the present invention, an image processing method for an image processing apparatus that performs color correction process to a video signal and transmits the video signal subjected to the color correction process to a display apparatus capable of setting a time interval at which a display screen is updated includes acquiring a first time interval which is set in the display apparatus and at which the display screen is updated; reading out a profile used for the color correction process for a video signal for displaying a video image in the display apparatus updating the display screen at a second time interval; converting the video signal for displaying a video image in the display apparatus updating the display screen at the second time interval if the first time interval is different from the second time interval; and performing the color correction process using the profile to the video signal resulting from the conversion and transmitting the video signal subjected to the color correction process to the display apparatus updating the display screen at the first time interval to display a first video image in the display apparatus. The converting step converts the video signal so that the difference between the first video image and a second video image becomes smaller than the difference between the second video image and a third video image and supplies the video signal resulting from the conversion to the processing step displaying the first video image. The second video image results from the color correction process using the profile used for displaying a video image in the display apparatus updating the display screen at the second time interval for a video signal that is not converted and is displayed in the display apparatus updating the display screen at the second time interval. The third video image results from the color correction process using the profile used for displaying a video image in the display apparatus updating the display screen at the second time interval for a video signal that is not converted and is displayed in the display apparatus updating the display screen at the first time interval.

According to another embodiment of the present invention, an image processing method for an image processing apparatus that performs color correction process to a video signal and transmits the video signal subjected to the color correction process to a display apparatus capable of setting a time interval at which a display screen is updated includes acquiring a first time interval which is set in the display apparatus and at which the display screen is updated; reading out a first profile used for displaying a video image in the display apparatus updating the display screen at a second time interval; converting a video signal that is input to display a video image in the display apparatus updating the display screen at the second time interval into a video signal for displaying a video image in the display apparatus updating the display screen at the first time interval if the first time interval is different from the second time interval; converting the first profile into a second profile used for displaying a video image in the display apparatus updating the display screen at the first time interval different from the second time interval; and performing the color correction process using the second profile to the video signal for displaying a video image in the display apparatus updating the display screen at the first time interval and transmitting the video signal subjected to the color correction process to the display apparatus updating the display screen at the first time interval to display a first video image in the display apparatus. The profile converting step converts the first profile into the second profile so that the difference between the first video image and a second video image becomes smaller than the difference between the second video image and a third video image. The second video image results from the color correction process using the first profile to an input video signal for displaying a video image in the display apparatus updating the display screen at the second time interval and is displayed in the display apparatus updating the display screen at the second time interval. The third video image results from the color correction process using the first profile to an input video signal for displaying a video image in the display apparatus updating the display screen at the second time interval and is displayed in the display apparatus updating the display screen at the first time interval.

Further features of the present invention will become apparent from the following description of exemplary embodiments with reference to the attached drawings.

BRIEF DESCRIPTION OF THE DRAWINGS

FIG. 7 shows an example of a three-dimensional table included in a detailed profile.

DESCRIPTION OF THE EMBODIMENTS

Exemplary embodiments of the present invention will herein be described in detail with reference to the attached drawings.

Figure 1:
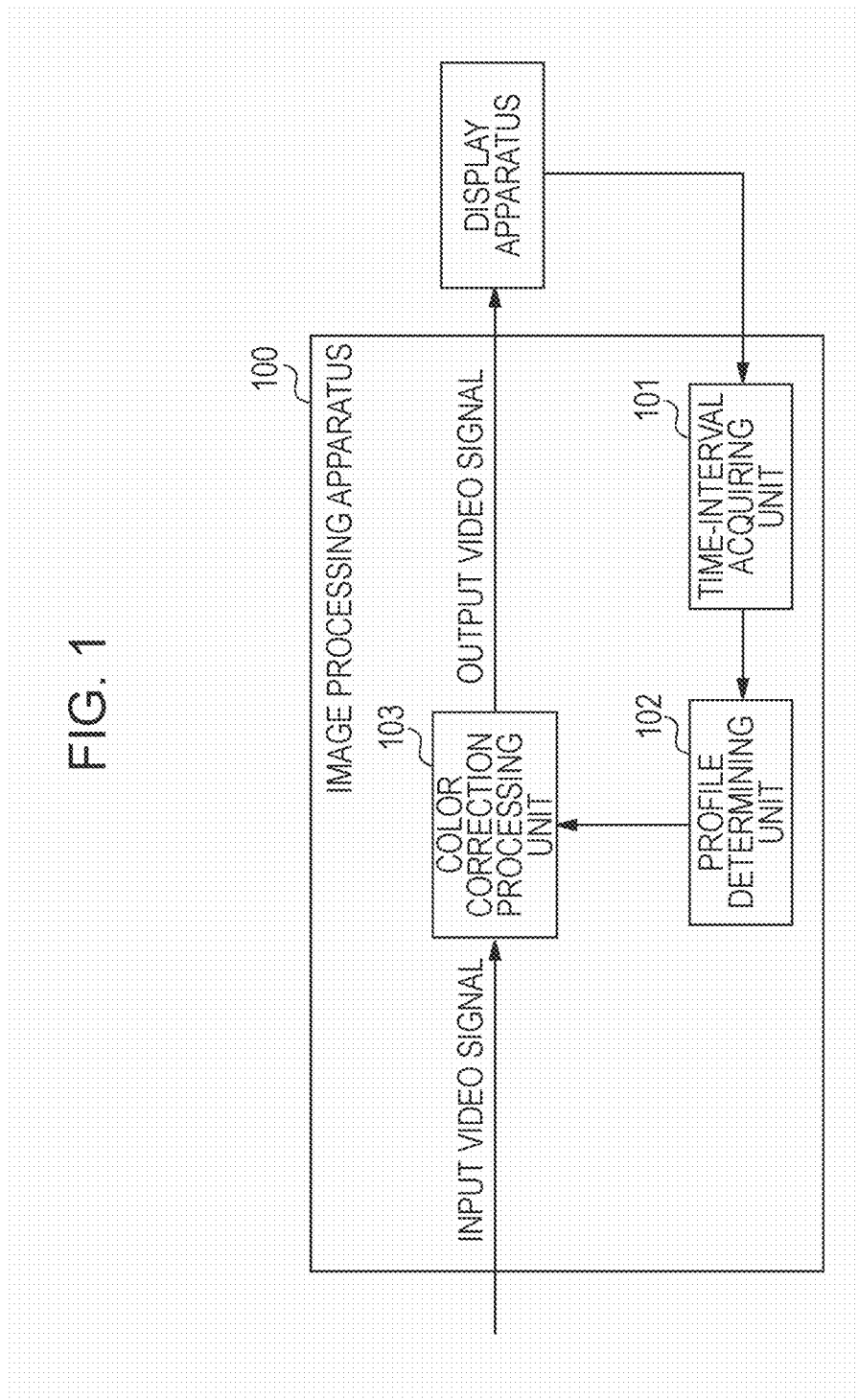
FIG. 1 is a block diagram showing an example of the configuration of an image processing apparatus according to a first exemplary embodiment of the present invention.

FIG. 1 is a block diagram showing an example of the configuration of an image processing apparatus 100 according to a first exemplary embodiment of the present invention.

Referring to FIG. 1, the image processing apparatus 100 includes a time-interval acquiring unit 101. The time-interval acquiring unit 101 acquires a time interval which is set in a display apparatus and at which the display screen is updated by a method described below.

Specifically, the time-interval acquiring unit 101 acquires the time interval at which the display screen is updated from the display apparatus and notifies a profile determining unit 102 of the acquired time interval.

In the first exemplary embodiment of the present invention, the time interval at which the display apparatus updates the display screen is hereinafter referred to as an update cycle, and the time interval (for example, 10 ms) which is used as a reference value and at with the display screen is updated is hereinafter referred to as a reference update cycle. However, the reference time interval at which the display screen is updated may not be equal to 10 ms.

The image processing apparatus 100 of the first exemplary embodiment performs processing to display a video image corresponding to an input video signal for displaying the video image on the reference update cycle in the display apparatus that updates the display screen on an update cycle different from the reference update cycle.

The time-interval acquiring unit 101 may acquire a vertical synchronizing frequency set in the display apparatus. The vertical synchronizing frequency represents the number of times the display apparatus updates the display screen per second. The vertical synchronizing frequency is also called a vertical scanning frequency or a refresh rate and is represented in hertz. In this case, the time-interval acquiring unit 101 acquires the vertical synchronizing frequency set in the display apparatus and notifies the profile determining unit 102 of the acquired vertical synchronizing frequency. The image processing apparatus 100 of the first exemplary embodiment performs processing to display a video image corresponding to an input video signal for displaying the video image at a reference vertical synchronizing frequency (for example, 60 Hz) in the display apparatus at a vertical synchronizing frequency (for example, 120 Hz) different from the reference vertical synchronizing frequency.

The profile determining unit 102 determines a destination profile (a profile corresponding to the display apparatus) used for a color correction process based on the update cycle acquired by the time-interval acquiring unit 101.

Specifically, the profile determining unit 102 determines a profile used for the color correction process based on the update cycle acquired by the time-interval acquiring unit 101 and notifies a color correction processing unit 103 of the determined destination profile.

The color correction processing unit 103 performs the color correction process to a video signal by using the destination profile determined by the profile determining unit 102.

The color correction processing unit 103 receives video data transmitted from, for example, a personal computer (PC), a digital camera, or a network camera as the input video signal. The input video signal is a video signal used for displaying a video image in the display apparatus that updates the display screen on the reference update cycle. In contrast, the display apparatus according to the first exemplary embodiment updates the display screen on an update cycle that is set. Accordingly, the color correction processing unit 103 converts the video signal used for displaying a video image in the display apparatus that updates the display screen on the reference update cycle into a video signal used for displaying a video image in the display apparatus that updates the display screen on the set update cycle.

Specifically, the color correction processing unit 103 acquires the update cycle included in the input video signal and converts the video signal if the acquired update cycle is different from the update cycle that is set in the display apparatus.

The color correction processing unit 103 performs the color correction process to the video signal resulting from the conversion. Then, the color correction processing unit 103 transmits the video signal resulting from the color correction process to the display apparatus as an output video signal. However, the input video signal input into the color correction processing unit 103 may be a video signal that has been already converted by a conversion unit (not shown).

As described above, the time-interval acquiring unit 101 may acquire the vertical synchronizing frequency that is set in the display apparatus. In this case, the profile determining unit 102 determines the destination profile used for the color correction process based on the vertical synchronizing frequency notified by the time-interval acquiring unit 101 and notifies the color correction processing unit 103 of the determined destination profile. The color correction processing unit 103 uses the destination profile notified by the profile determining unit 102 to perform the color correction process to the video signal.

As in the case of the update cycle, the color correction processing unit 103 converts the video signal used for displaying a video image at the reference vertical synchronizing frequency into a video signal used for displaying a video image at the vertical synchronizing frequency that is acquired.

Figure 2:
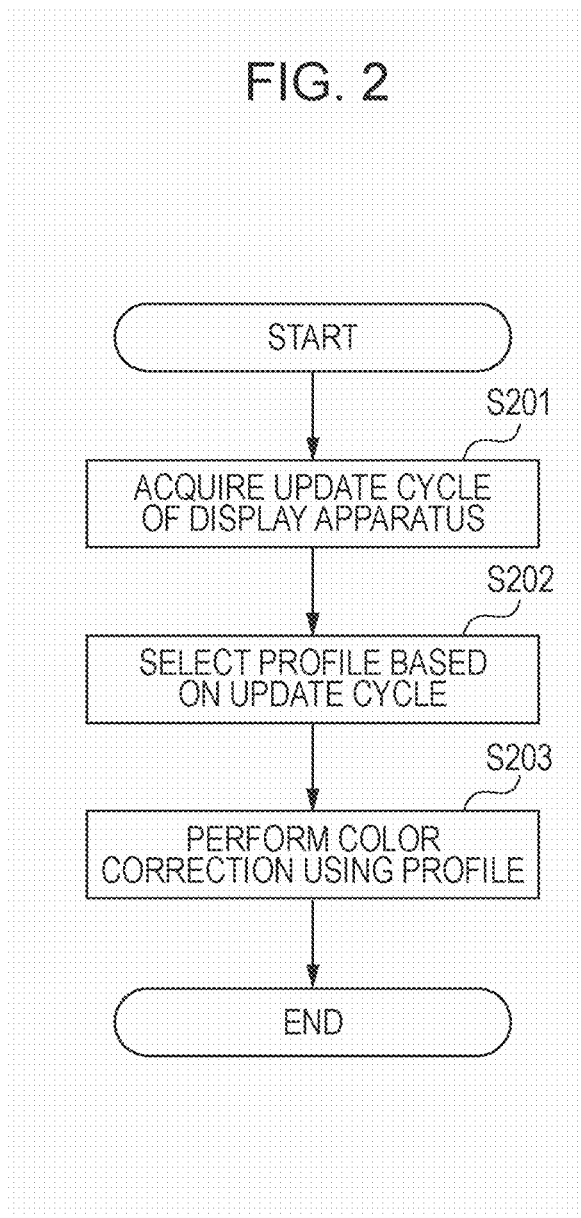
FIG. 2 is a flowchart showing an example of the outline of a process performed by the image processing apparatus of the first exemplary embodiment.

FIG. 2 is a flowchart showing an example of the outline of a process performed by the image processing apparatus 100 of the first exemplary embodiment.

Referring to FIG. 2, in Step S201 (an acquiring step), the time-interval acquiring unit 101 acquires an update cycle on which the display apparatus updates the display screen.

The process of acquiring the update cycle by the profile determining unit 102 in Step S201 will be described below.

In Step S202 (a determining step), the profile determining unit 102 selects a profile used for the color correction process from existing profiles based on the update cycle acquired in Step S201.

Specifically, the profile determining unit 102 determines the profile used for the color correction process based on the update cycle acquired by the time-interval acquiring unit 101 in Step S202.

The structure of the profile and the process of determining the profile by the profile determining unit 102 will be described below.

In Step S203 (a processing step), the color correction processing unit 103 uses the profile determined in Step S202 to perform the color correction process.

Specifically, the color correction processing unit 103 performs the color correction process using the determined profile to the video signal in Step S203.

The color correction process performed by the color correction processing unit 103 will be described below.

As described above, the time-interval acquiring unit 101 may acquire a vertical synchronizing frequency. In this case, the time-interval acquiring unit 101 acquires the vertical synchronizing frequency set in the display apparatus in Step S201 (the acquiring step) and notifies the profile determining unit 102 of the acquired vertical synchronizing frequency. The profile determining unit 102 determines the destination profile used for the color correction process based on the vertical synchronizing frequency notified by the time-interval acquiring unit 101 in Step S202 (the determining step). The color correction processing unit 103 uses the destination profile determined by the profile determining unit 102 to perform the color correction process to the video signal in Step S203 (the processing step).

The process of acquiring the time interval at which the display apparatus updates the display screen, performed by the time-interval acquiring unit 101, will now be described with reference to FIGS. 3A and 3B. This process corresponds to Step S201 in FIG. 2, performed by the time-interval acquiring unit 101.

Figure 3:
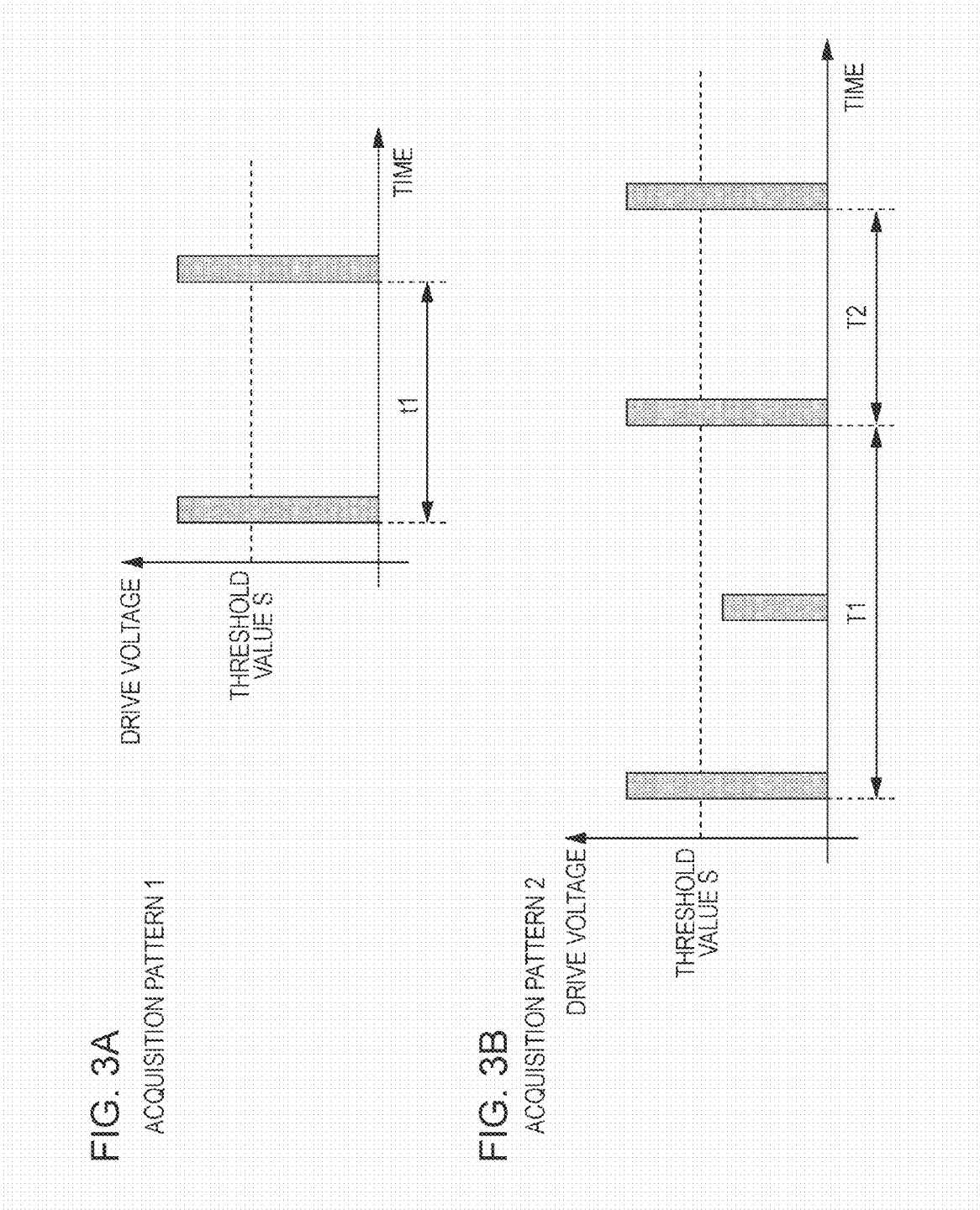
FIGS. 3A and 3B are conceptual diagrams illustrating how a drive voltage is varied with time at a certain display position on a display apparatus.

FIGS. 3A and 3B are conceptual diagrams illustrating how a drive voltage is varied with time. The drive voltage is applied to display a video image at a certain display position on the display apparatus. The display apparatus according to the first exemplary embodiment includes a drive circuit generating the drive voltage applied to display a video image on the screen. The drive circuit in the display apparatus is provided with a terminal through which the drive voltage is externally acquired. The time-interval acquiring unit 101 of the first exemplary embodiment acquires the drive voltage from the terminal for the acquisition of the drive voltage.

In an acquisition pattern 1 in FIG. 3A, the time-interval acquiring unit 101 acquires a time when the drive voltage at a certain display position reaches a threshold value S. The time-interval acquiring unit 101 also acquires a time when the drive voltage decreases from the threshold value S and, then, reaches the threshold value S again. The time-interval acquiring unit 101 acquires an update cycle t1 from the two times when the drive voltage reaches the threshold value S. The time-interval acquiring unit 101 is capable of acquiring the update cycle t1 from the times when the drive voltage reaches the threshold value S in the above manner.

In other words, the time-interval acquiring unit 101 acquires the update cycle by measuring the time interval between the times when the voltage applied to display a video image on the display screen exceeds the threshold value.

In an acquisition pattern 2 in FIG. 3B, the time-interval acquiring unit 101 acquires multiple times when the drive voltage at a certain display position reaches the threshold value S. The time-interval acquiring unit 101 acquires multiple time intervals from the acquired times. In the example in FIG. 3B, the multiple time intervals are denoted by T1 and T2. The time-interval acquiring unit 101 acquires the shortest time interval, among the acquired multiple time intervals, as the update cycle. In the example in FIG. 3B, the time-interval acquiring unit 101 acquires the time interval T2, which is the shortest time interval, as the update cycle set for the display apparatus.

Specifically, the time-interval acquiring unit 101 measures multiple time intervals between the times when the voltage applied to display a video image on the display screen exceeds the threshold value and acquires the shortest time interval, among the time intervals between the times when the voltage exceeds the threshold value, as the update cycle.

With this method, the time-interval acquiring unit 101 is capable of acquiring the update cycle if, for example, the drive voltage does not reach the threshold value S at a display position where the drive voltage is measured because the luminance of the video image is temporarily decreased.

Alternatively, the time-interval acquiring unit 101 may measure the drive voltages at multiple display positions on the display screen to acquire the update cycle. For example, the time-interval acquiring unit 101 sets multiple display positions where the drive voltages are measured at predetermined intervals. If the time interval between the times when the drive voltage exceeds the threshold value S is varied between the multiple display positions, the time-interval acquiring unit 101 acquires the shortest time interval as the update cycle.

In other words, the time-interval acquiring unit 101 measures the time intervals between the times when the applied voltage exceeds the threshold value at the multiple display positions on the display screen.

With this method, the time-interval acquiring unit 101 is capable of acquiring the update cycle if, for example, the drive voltage does not reach the threshold value S at some display positions on the display screen because the luminance of the video image is low.

Alternatively, the time-interval acquiring unit 101 may determine a part where the luminance of a video image is high from video information included in the input video signal and may set a position on the display screen where the drive voltage is measured based on the determined part.

In other words, the time-interval acquiring unit 101 selects multiple display positions from the video signal based on the luminance information.

With this method, the time-interval acquiring unit 101 is capable of acquiring the update cycle if the drive voltage does not reach the threshold value S at part of the video image.

Alternatively, the time-interval acquiring unit 101 may determine the luminance of a video image from the input video signal and may set the threshold value S based on the determined luminance. Specifically, the time-interval acquiring unit 101 sets the threshold value S to a lower value if the time-interval acquiring unit 101 determines that the luminance of the video image is low from the input video signal and acquires the update cycle based on the set threshold value S.

With this method, the time-interval acquiring unit 101 is capable of acquiring the update cycle if, for example, the drive voltage does not reach the threshold value S because the luminance of the entire display screen is low. The time-interval acquiring unit 101 is also capable of acquiring the update cycle without changing the display position where the drive voltage is measured if, for example, the drive voltage does not reach the threshold value S because the luminance of the display part where the drive voltage is measured is low.

As described above, the time-interval acquiring unit 101 is capable of acquiring the update cycle by measuring the drive voltage even if, for example, it is not possible to acquire information about the update cycle from a memory etc. in the display apparatus.

The time-interval acquiring unit 101 may acquire the vertical synchronizing frequency. In this case, for example, the time-interval acquiring unit 101 calculates a vertical synchronizing frequency f according to Equation (1):

$$f = \frac{1}{t1} \qquad (1)$$

where t1 denotes a time period during which the drive voltage reaches the threshold value S, decreases to a value lower than the threshold value S, and reaches the threshold value S again.

The time period t1 corresponds to the update cycle. In other words, the method of acquiring the update cycle described above can be used also when the time period t1 is acquired to calculate the vertical synchronizing frequency.

The method of acquiring the update cycle or the vertical synchronizing frequency is not restricted to the method by using the drive voltage that is measured. If the update cycle or the vertical synchronizing frequency is stored in the memory etc. in the display apparatus, the time-interval acquiring unit 101 may acquire the update cycle or the vertical synchronizing frequency from the memory. Alternatively, the time-interval acquiring unit 101 may acquire a value of the update cycle or the vertical synchronizing frequency, which is specified for the display apparatus by a user.

The process of determining the profile will now be described. The profile determining unit 102 selects the destination profile corresponding to the update cycle acquired in Step S201 from the existing profiles. This process corresponds to Step S202 in FIG. 2, performed by the profile determining unit 102. The destination profiles are stored in the profile determining unit 102 in the first exemplary embodiment. The profile determining unit 102 stores the multiple destination profiles in association with the update cycles. The profile determining unit 102 determines the destination profile used for the color correction process based on the update cycle notified by the time-interval acquiring unit 101.

The destination profile according to the first exemplary embodiment will now be described. The destination profile is a profile used for converting the color signal corresponding to an input video signal into the color signal corresponding to the color space of a destination device (display apparatus).

The destination profile according to the first exemplary embodiment includes the values of the update cycles and a 3×3 matrix used for converting the XYZ tristimulus values corresponding to the input video signal into the XdYdZd values corresponding to the color space of the display apparatus. The destination profile also includes a 3×3 matrix used for converting the XYZ tristimulus values into RGB signal values and the gamma characteristics of the RGB signal values of the display apparatus.

In other words, the profile determining unit 102 of the first exemplary embodiment stores the 3×3 matrix used for converting the XYZ tristimulus values corresponding to the input video signal into the XdYdZd values corresponding to the color space of the display apparatus, the 3×3 matrix used for converting the XYZ tristimulus values into the RGB signal values, and the gamma characteristics of the RGB signal values of the display apparatus for every update cycle as the destination profile.

The profile determining unit 102 determines the destination profile used for the color correction process based on the update cycle notified by the time-interval acquiring unit 101.

The destination profile is not restricted to the above one and may include an appropriate combination of a 3×3 matrix, a three-dimensional table, RGB gamma characteristics, the maximum luminance of RGB signal values, the color temperature of white, and so on.

The image processing apparatus 100 of the first exemplary embodiment creates the destination profile for every update cycle in the following manner. Specifically, for example, the image processing apparatus 100 compares a video image reproduced on the reference update cycle (for example, 10 ms) set for the input video signal with a video image resulting from reproduction of the video signal on another update cycle (for example, 5 ms). The image processing apparatus 100 creates the destination profile corresponding to the other update cycle so that the difference in luminance and color between the video image reproduced on the other update cycle (5 ms) and the video image reproduced on the reference update cycle becomes small. The input video signal used for displaying a video image on the reference update cycle is converted into a video signal used for displaying the video image on the other update cycle.

Figure 9:
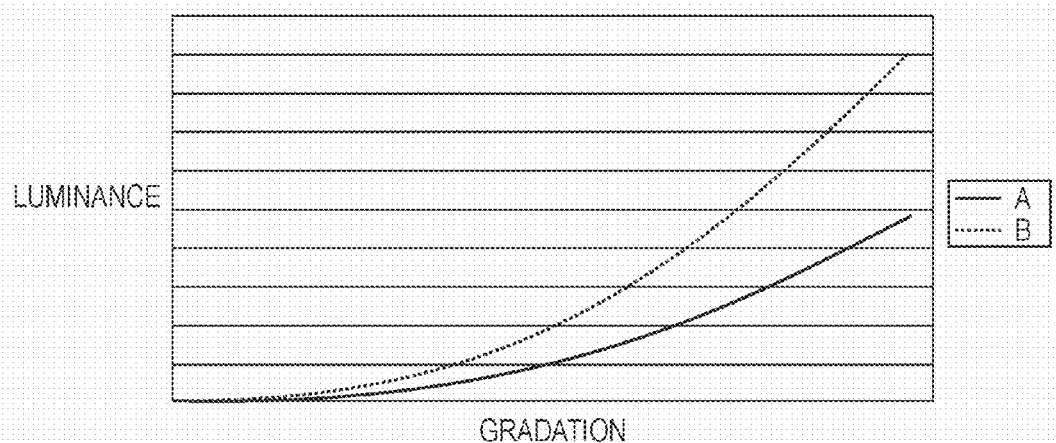
FIG. 9 is a graph showing how the luminance is varied relative to the gradation in a display apparatus.

The luminance and color of the video image reproduced when the input video signal used for reproducing a video image on the reference update cycle is subjected to the color correction process using the profile used for reproducing a video image on the reference update cycle and is displayed in the display apparatus updating the display screen on the reference update cycle are used as the reference luminance and color. However, when a video image is reproduced in the display apparatus updating the display screen on an update cycle different from the reference update cycle, the color correction process using the profile corresponding to the reference update cycle results in a video image of luminance and color that are different from the reference luminance and color. For example, when the update cycle is shorter than the reference update cycle as in the case shown in FIG. 9, the luminance of the video image becomes higher than the reference luminance. However, even when a video image is reproduced in the display apparatus updating the display screen on the update cycle different from the reference update cycle, it is desirable that the luminance and color of the video image be close to the reference luminance and color as much as possible. In other words, it is desirable that the variation in luminance and color of a reproduced video image depending on the update cycle set for the display apparatus be suppressed as much as possible. Accordingly, the image processing apparatus 100 compares the luminance and color of a test video image displayed on the reference update cycle with those of a test video image displayed on another update cycle. The image processing apparatus 100 creates the destination profile corresponding to the reference update cycle so that the luminance and color of the video image displayed on the other update cycle becomes close to those of the video image displayed on the reference update cycle in order to use the destination profile in the color correction process for the other update cycle. The image processing apparatus 100 creates the destination profile corresponding to each update cycle in the above manner. The profile determining unit 102 of the first exemplary embodiment stores the destination profiles corresponding to the multiple update cycles, which have been created in advance in the above manner. However, the image processing apparatus 100 may read out the destination profiles from another apparatus and may store the readout destination profiles.

The image processing apparatus 100 may create the destination profile corresponding to each vertical synchronizing frequency, instead of the update cycle. In this case, the image processing apparatus 100 compares the video image reproduced at the reference vertical synchronizing frequency (for example, 60 Hz) set for the input video signal with the video image resulting from reproduction of the same video signal at another vertical synchronizing frequency (for example, 120 Hz). The image processing apparatus 100 creates the destination profile corresponding to the other vertical synchronizing frequency so that the difference in luminance and color between the video image reproduced at the other vertical synchronizing frequency (120 Hz) and the video image reproduced at the reference vertical synchronizing frequency (60 Hz) becomes small. The input video signal used for displaying a video image at the reference vertical synchronizing frequency is converted into a video signal used for displaying a video image at the other vertical synchronizing frequency. The profile determining unit 102 of the first exemplary embodiment stores the destination profiles corresponding to the multiple vertical synchronizing frequencies, which have been created in advance in the above manner.

The color correction processing unit 103 performs the color correction process to the video signal by using a source profile and the destination profile determined in Step S202. This process corresponds to Step S203 in FIG. 2, performed by the color correction processing unit 103.

Figure 4:
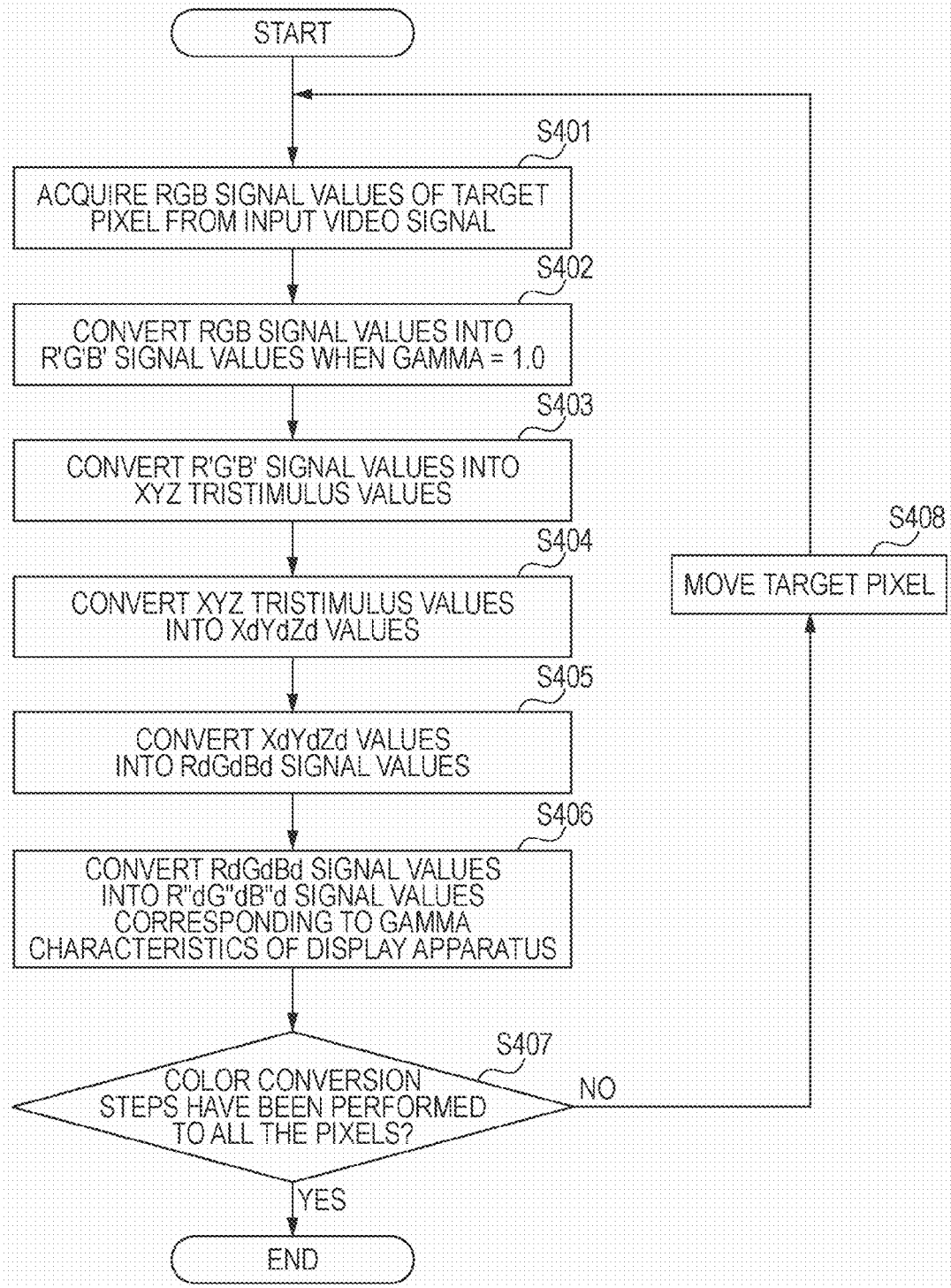
FIG. 4 is a flowchart illustrating an example of a color correction process.

FIG. 4 is a flowchart illustrating an example of the color correction process performed by the color correction processing unit 103. The color correction processing unit 103 of the first exemplary embodiment converts the video signal used for displaying a video image in the display apparatus updating the display screen on the reference update cycle into the video signal used for displaying a video image in the display apparatus updating the display screen on another update cycle that is set for the display apparatus, as described above.

Referring to FIG. 4, in Step S401, the color correction processing unit 103 acquires the RGB signal values of a target pixel from the input video signal.

The color correction processing unit 103 uses the source profile to convert the RGB signal values acquired in Step S401 into XYZ tristimulus values in Steps S402 and S403. The source profile according to the first exemplary embodiment includes the gamma characteristics of the RGB signal values corresponding to the input video signal and, for example, a 3×3 matrix used for converting the RGB signal values into the XYZ tristimulus values. The source profile may be included in the input video signal, may be stored in the image processing apparatus 100 in advance, or may be specified by the user.

In Step S402, the color correction processing unit 103 uses the source profile to perform inverse gamma correction to the target pixel. Specifically, the color correction processing unit 103 uses the RGB gamma characteristics included in the source profile to convert the RGB signal values acquired in Step S401 into R'G'B' signal values when the gamma=1.0. The color correction processing unit 103 converts the RGB signal values of the target pixel according to Equation (2):

$$\left.\begin{array}{l} R' = (R)^{\gamma_R} \\ G' = (G)^{\gamma_G} \\ B' = (B)^{\gamma_B} \end{array}\right\} \quad (2)$$

where R', G', and B' denote image signals when gamma=1.0 and $\gamma_R$, $\gamma_G$, and $\gamma_B$ denote the gamma values corresponding to the gamma characteristics of the input video signal.

In Step S403, the color correction processing unit 103 converts the R'G'B' signal values calculated in Step S402 into XYZ tristimulus values by using the 3×3 matrix included in the source profile. The color correction processing unit 103 performs the conversion according to Equation (3) when the R'G'B' signal values are in an RGB color space:

$$\begin{bmatrix} X \\ Y \\ Z \end{bmatrix} = \begin{bmatrix} 2.7689 & 1.7518 & 1.1.302 \\ 1.0000 & 4.5907 & 0.0601 \\ 0 & 0.0565 & 5.5943 \end{bmatrix} \cdot \begin{bmatrix} R' \\ G' \\ B' \end{bmatrix} \quad (3)$$

In Step S404, the color correction processing unit 103 performs gamut mapping by using the destination profile selected in Step S202. Specifically, the color correction processing unit 103 converts the XYZ tristimulus values calculated in Step S403 into XdYdZd values by using the destination profile. The XdYdZd values represent the XYZ tristimulus values corresponding to the color space of the display apparatus.

As described above, the destination profile selected in Step S202 includes the 3×3 matrix used for calculating the XdYdZd values from the XYZ tristimulus values corresponding to the input video signal. The color correction processing unit 103 uses the 3×3 matrix to convert the XYZ tristimulus values into the XdYdZd values corresponding to the color space of the display apparatus.

Various methods for the gamut mapping are known. For example, a method is proposed in which the brightest color of a source is matched with the brightest color of a destination, the darkest color of the source is matched with the darkest color of the destination, and the relationship between the brightest color and the darkest color is kept for the other colors. A method is also proposed in which the white of a source is mapped into the white of a destination, the colors in the gamut are accurately reproduced, and the colors outside the gamut are clipped to the colors that can be reproduced and that is closest to the original colors. The method for the gamut mapping is not restricted to a specific one in the first exemplary embodiment.

In Step S405, the color correction processing unit 103 converts the XdYdZd values calculated in Step S404 into RdGdBd signal values by using the destination profile. The RdGdBd signal values represent the RGB signal values corresponding to the color space of the display apparatus.

As described above, the destination profile selected in Step S202 includes the 3×3 matrix used for converting the XYZ tristimulus values into the RGB signal values. The color correction processing unit 103 uses the 3×3 matrix to convert the XdYdZd values according to Equation (4):

$$\begin{bmatrix} Rd \\ Gd \\ Bd \end{bmatrix} = \begin{bmatrix} X_R & X_G & X_B \\ Y_R & Y_G & Y_B \\ Z_R & Z_G & Z_B \end{bmatrix}^{-1} \cdot \begin{bmatrix} Xd \\ Yd \\ Zd \end{bmatrix} \quad (4)$$

where Xd, Yd, and Zd denote the XYZ tristimulus values in the color space of the display apparatus and Rd, Gd, and Bd denote the RGB signal values in the color space of the display apparatus.

The 3×3 matrix in Equation (4) is included in the destination profile.

In Step S406, the color correction processing unit 103 converts the RdGdBd signal values calculated in Step S405 into R"dG"dB"d signal values corresponding to the gamma characteristics of the display apparatus by using the destination profile.

As described above, the destination profile selected in Step S202 includes the gamma characteristics of the display apparatus. The color correction processing unit 103 uses the gamma characteristics of the display apparatus to convert the RdGdBd signal values according to Equation (5):

$$\left. \begin{array}{l} R'' = (Rd)^{3/\gamma'_R} \\ G'' = (Gd)^{1/\gamma'_G} \\ B'' = (Bd)^{3/\gamma'_B} \end{array} \right\} \quad (5)$$

where R", G", and B" denote the signals subjected to the gamma correction and $\gamma'_R$, $\gamma'_G$, and $\gamma'_B$ denote the gamma values corresponding to the gamma characteristics of the display apparatus.

In Step S407, the color correction processing unit 103 determines whether the color conversion steps have been completed for all the pixels in one frame. If the color correction processing unit 103 determines that the color conversion steps have been completed for all the pixels in one frame, the color correction process is terminated. If the color correction processing unit 103 determines that the color conversion steps have not been completed for all the pixels in one frame, the process proceeds to Step S408.

In Step S408, the color correction processing unit 103 moves the target pixel. Then, the process goes back to Step S401. The target pixel is moved, for example, from the pixel at the upper left corner of the screen to the pixel at the lower right corner thereof. However, the movement of the target pixel is not restricted to the above one. In addition, the color correction process may be performed in a manner different from the above manner.

As described above, the image processing apparatus 100 of the first exemplary embodiment acquires the update cycle of the display apparatus and performs the color correction process using the destination profile corresponding to the acquired update cycle.

With this method, it is possible to reduce the variation of the video image due to different vertical synchronizing frequencies (time intervals at which the display screen is updated).

The image processing apparatus 100 may acquire the vertical synchronizing frequency, instead of the update cycle, and may perform the color correction process using the destination profile corresponding to the acquired vertical synchronizing frequency.

The image processing apparatus 100 of the first exemplary embodiment may be incorporated in the display apparatus or may be separated from the display apparatus.

A second exemplary embodiment of the present invention will now be described. The description focuses on the difference from the first exemplary embodiment.

The profile determining unit 102 of the first exemplary embodiment stores the destination profile for each update cycle on which the display screen is updated. The profile determining unit 102 determines the destination profile used for the color correction process based on the time interval at which the display screen is updated and which is acquired by the time-interval acquiring unit 101.

In contrast, a profile determining unit 202 of the second exemplary embodiment stores a destination profile used for displaying a video image at a reference time interval (for example, 10 ms) at which the display screen is updated. An example in which the destination profile used for displaying a video image at the reference time interval at which the display screen is updated is converted based on an acquired time interval at which the display screen is updated will be described in the second exemplary embodiment.

As in the first exemplary embodiment, the time interval at which the display screen is updated is referred to as the update cycle. The time interval (for example, 10 ms) which is used as a reference value and at with the display screen is updated is referred to as the reference update cycle. However, the reference time interval at which the display screen is updated may not be equal to 10 ms and may be set to an appropriate value. An image processing apparatus 200 of the second exemplary embodiment performs processing to display a video image corresponding to an input video signal for displaying the video image on the reference update cycle in a display apparatus that updates the display screen on another update cycle different from the reference update cycle.

Figure 5:
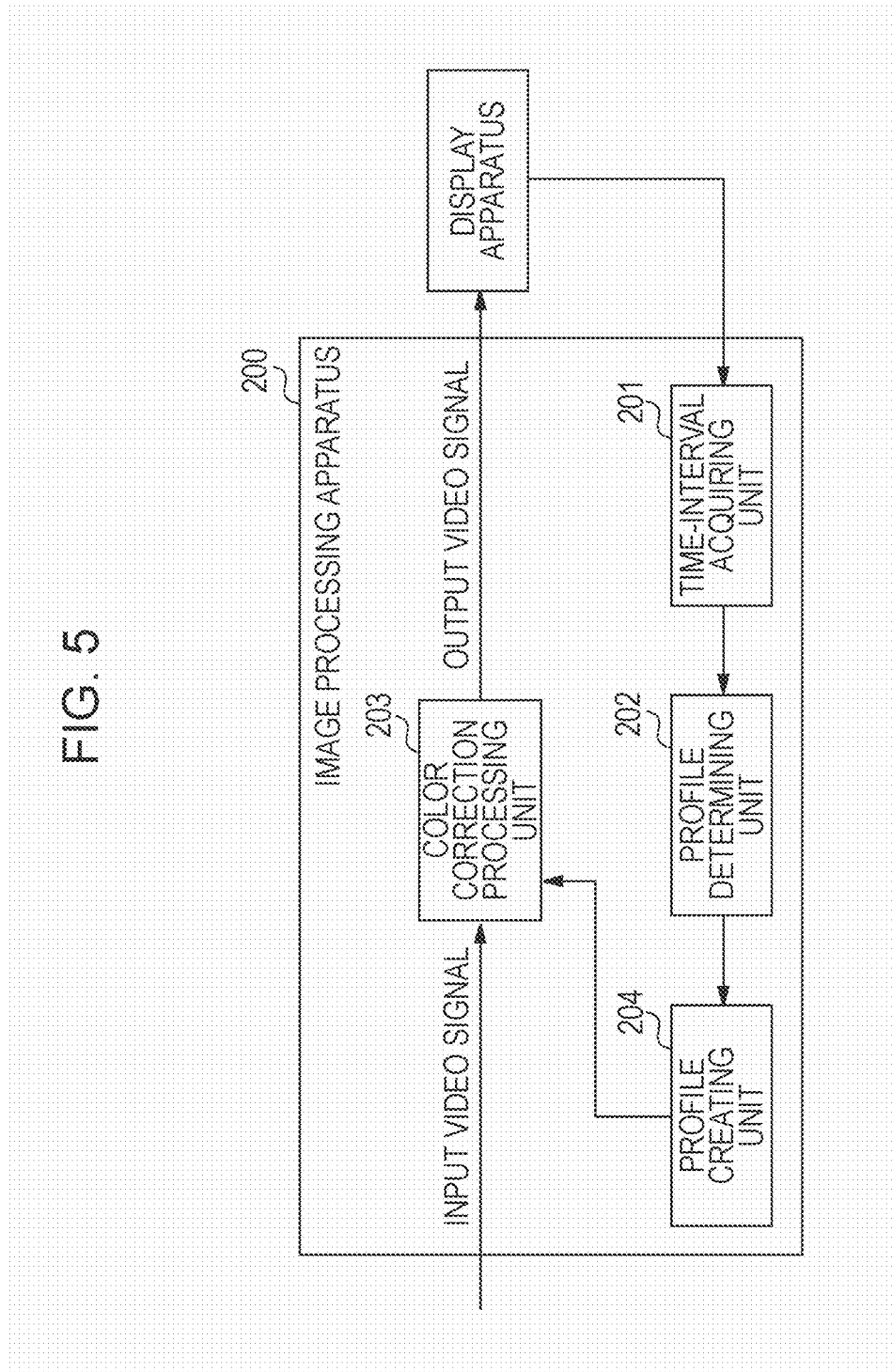
FIG. 5 is a block diagram showing an example of the configuration of an image processing apparatus according to a second exemplary embodiment of the present invention.

FIG. 5 is a block diagram showing an example of the configuration of the image processing apparatus 200 according to the second exemplary embodiment. Referring to FIG. 5, a time-interval acquiring unit 201 updates the update cycle in the display apparatus in a manner similar to that of the time-interval acquiring unit 101 of the first exemplary embodiment.

Specifically, the time-interval acquiring unit 201 acquires a time interval (a first time interval) which is set in the display apparatus and at which the display screen is updated. The time-interval acquiring unit 201 may acquire the vertical synchronizing frequency, as in the first exemplary embodiment.

The profile determining unit 202 stores a destination profile used for displaying a video image on the reference update cycle (at a second time interval).

Specifically, the profile determining unit 202 stores the destination profile (a first profile) used for displaying a video image in the display apparatus updating the display screen on the reference update cycle (at the second time interval).

This destination profile includes the value of the reference update cycle (for example, 10 ms) and a three-dimensional table used for converting XYZ tristimulus values into the RGB signal values corresponding to the reference update cycle. This destination profile also includes a 3×3 matrix used for converting the XYZ tristimulus values corresponding to an input video signal into the XdYdZd values corresponding to the color space of the display apparatus. This destination profile further includes the gamma characteristics of the RGB signal values of the display apparatus updating the display screen on the reference update cycle. However, the structure of the destination profile is not restricted to the above one. The destination profile having the above structure is called a detailed profile (the first profile).

The profile determining unit 202 of the second exemplary embodiment stores a simple profile (correction information) used for converting the detailed profile so that the difference in luminance and color between the video image reproduced on an update cycle different from the reference update cycle and the video image reproduced on the reference update cycle is reduced.

The image processing apparatus 200 of the second exemplary embodiment creates the simple profile in advance in the following manner and stores the simple profile in the profile determining unit 202. Specifically, the image processing apparatus 200 compares the video image reproduced on the reference update cycle (for example, 10 ms) corresponding to the input video signal with the video image reproduced on another update cycle (for example, 5 ms). The image processing apparatus 100 creates the simple profile used for converting the detailed profile so that the difference in luminance and color between the video image reproduced on the other update cycle and the video image reproduced on the reference update cycle becomes small. In other words, the image processing apparatus 200 creates the simple profile used for converting the detailed profile corresponding to the reference update cycle so that a test video image displayed on a certain update cycle becomes close to the video image displayed on the reference update cycle. The profile determining unit 202 of the second exemplary embodiment stores the simple profiles corresponding to the multiple update cycles, which have been created in advance in the above manner. However, the image processing apparatus 200 may read out the destination profiles from another apparatus and may store the readout destination profiles.

A profile creating unit 204 in the image processing apparatus 200 creates a profile (a created profile) corresponding to the update cycle acquired by the time-interval acquiring unit 201. Specifically, the profile creating unit 204 uses the simple profile (the correction information) corresponding to the acquired update cycle to convert the detailed profile corresponding to the reference update cycle and creates the created profile corresponding to the acquired update cycle. The display apparatus of the second exemplary embodiment displays a video image (a first video image) corresponding to the output video signal that results from the color correction process using the created profile for the video signal that is converted to display a video image on the update cycle of the display apparatus. The first video image is displayed in the display apparatus updating the display screen on the acquired update cycle (at the first time interval).

Figure 10:
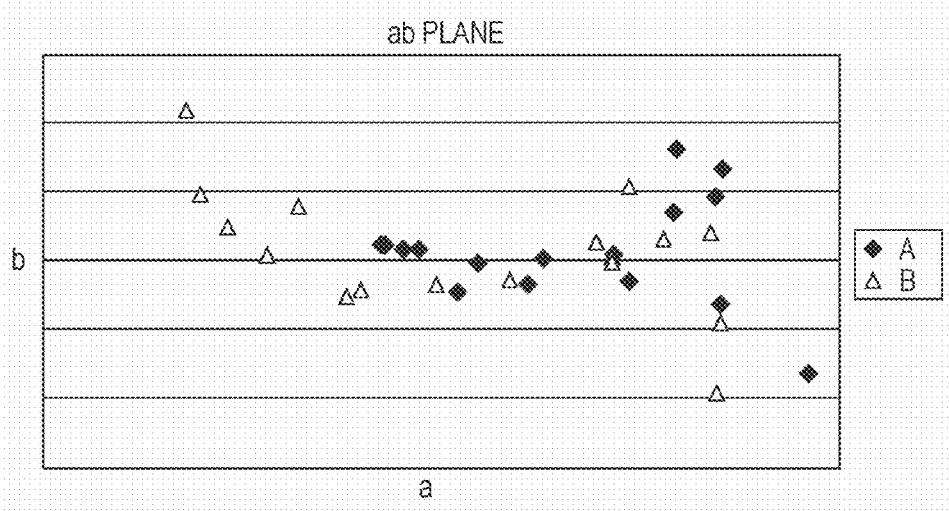
FIG. 10 illustrates an a-b plane showing the vertical synchronizing frequencies in a display apparatus.

It is desirable that the difference between the first video image and a second video image be small. The second video image results from the color correction process using the detailed profile corresponding to the reference update cycle for the input video signal used for displaying a video image on the reference update cycle. The second video image is displayed in the display apparatus updating the display screen on the reference update cycle (at the second time interval). The second video image differs in luminance and color from a third video image, as described above with reference to FIGS. 9 and 10. The third video image results from the color correction process using the detailed profile corresponding to the reference update cycle for the input video signal used for displaying a video image on the reference update cycle. The third video image is displayed in the display apparatus updating the display screen on the update cycle (at the first time interval) different from the reference update cycle.

Specifically, the profile creating unit 204 converts the detailed profile corresponding to the reference update cycle so that the difference between the first and second video images becomes smaller than the difference between the third and second video images. In other words, the profile creating unit 204 converts the detailed profile (the first profile) corresponding to the reference update cycle into the created profile (a second profile).

The profile creating unit 204 supplies the created profile (the second profile) resulting from the conversion to a color correction processing unit 203.

Specifically, the profile creating unit 204 converts the first profile into the second profile when the first video image is displayed in the display apparatus updating the display screen on the update cycle (at the first time interval) different from the reference update cycle (the second time interval). The first profile indicates the detailed profile corresponding to the reference update cycle and the second profile indicates the created profile. The profile creating unit 204 converts the detailed profile corresponding to the reference update cycle into the created profile so that the difference between the first and second video images becomes smaller than the difference between the third and second video images, as described above.

The color correction processing unit 203 performs the color correction process to the video signal by using the created profile created by the profile creating unit 204. The color correction processing unit 203 transmits the video signal resulting from the color correction process using the created profile to the display apparatus as the output video signal. The display apparatus receives the output video signal and displays the video image corresponding to the output video signal. As described above, the first video image displayed in the display apparatus of the second exemplary embodiment corresponds to the output video signal resulting from the color correction process using the created profile for the video signal that is converted to display a video image on the acquired update cycle (at the first time interval) and is displayed on the display screen on the acquired update cycle (at the first time interval).

The input video signal input into the color correction processing unit 203 of the second exemplary embodiment is used to display a video image in the display apparatus updating the display screen on the reference update cycle (at the second time interval). In contrast, the display apparatus of the second exemplary embodiment updates the display screen on the acquired update cycle (at the first time interval). Accordingly, the color correction processing unit 203 converts the video signal used for displaying a video image in the display apparatus that updates the display screen on the reference update cycle into a video signal used for displaying a video image in the display apparatus that updates the display screen on the acquired update cycle. The color correction processing unit 203 performs the color correction process to the video signal resulting from the conversion.

In other words, the color correction processing unit 203 converts the video signal that is input to display a video image in the display apparatus updating the display screen on the reference update cycle (at the second time interval) into a video signal used for displaying a video image in the display apparatus updating the display screen on the acquired update cycle (at the first time interval).

The color correction processing unit 203 acquires the update cycle included in the input video signal and converts the video signal if the acquired update cycle is different from the update cycle that is set in the display apparatus.

However, the input video signal input into the color correction processing unit 203 may be a video signal that has been already converted by a conversion unit (not shown) based on the update cycle set in the display apparatus.

Alternatively, the color correction processing unit 203 may perform the color correction process to the video signal corresponding to the reference update cycle and may convert the video signal subjected to the color correction process into a video signal corresponding to the update cycle set in the display apparatus.

The color correction processing unit 203 transmits the video signal resulting from the color correction process to the display apparatus as the output video signal. The display apparatus updates the display screen on the acquired update cycle (at the first time interval) to display a video image.

Specifically, the color correction processing unit 203 performs the color correction process to the video signal used for displaying a video image in the display apparatus updating the display screen on the first time interval by using the second profile used for displaying a video image in the display apparatus updating the display screen on the first time interval. The color correction processing unit 203 transmits the video signal resulting from the color correction process to the display apparatus updating the display screen at the first time interval to display the first video image in the display apparatus. The second profile is the created profile created by converting the detailed profile corresponding to the reference update cycle.

Although the example is described in the second exemplary embodiment in which the detailed profile corresponding to the reference update cycle is converted into the created profile based on the acquired update cycle, the vertical synchronizing frequency may be acquired, as in the first exemplary embodiment. Specifically, the profile determining unit 202 may convert the detailed profile corresponding to the reference update cycle into the created profile based on the vertical synchronizing frequency acquired by the time-interval acquiring unit 201. In this case, the profile determining unit 202 stores the multiple simple profiles (the multiple pieces of correction information) used for converting the detailed profile corresponding to the reference update cycle based on the vertical synchronizing frequency.

Figure 6:
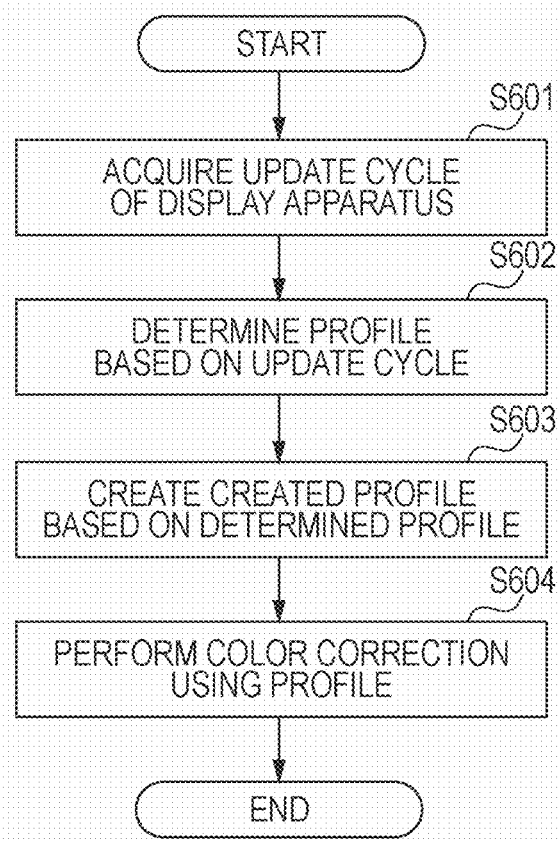
FIG. 6 is a flowchart showing an example of the outline of a process performed by the image processing apparatus of the second exemplary embodiment.

FIG. 6 is a flowchart showing an example of the outline of a process performed by the image processing apparatus 200 of the second exemplary embodiment. The image processing apparatus 200 of the second exemplary embodiment stores the detailed profile (the first profile) used for the color correction process for the video signal for displaying a video image in the display apparatus updating the display screen on the reference update cycle (at the second time interval).

Referring to FIG. 6, in Step S601 (an acquiring step), the time-interval acquiring unit 201 acquires an update cycle. The time-interval acquiring unit 201 acquires the update cycle in the same manner as in the first exemplary embodiment. Specifically, the time-interval acquiring unit 201 acquires the time interval (the first time interval) at which the display screen is updated and which is set in the display apparatus in Step S601.

In Step S602 (a readout step), the profile determining unit 202 determines a simple profile used for the conversion of the detailed profile based on the update cycle acquired in Step S601. The profile determining unit 202 reads out the detailed profile corresponding to the reference update cycle in Step S602.

Specifically, the profile determining unit 202 reads out the profile used for displaying a video image in the display apparatus updating the display screen on the reference update cycle (at the second time interval) in Step S602.

The profile determining unit 202 notifies the profile creating unit 204 of the simple profile and the detailed profile corresponding to the reference update cycle.

In Step S603 (a profile converting step), the profile creating unit 204 creates a created profile corresponding to the acquired update cycle based on the simple profile determined in Step S602 and the detailed profile corresponding to the reference update cycle. Specifically, the profile creating unit 204 converts the detailed profile corresponding to the reference update cycle by using the simple profile corresponding to the acquired update cycle to create the profile (the created profile) corresponding to the acquired update cycle in Step S603. In other words, the profile creating unit 204 creates the detailed profile corresponding to the acquired update cycle as the created profile.

Specifically, the profile creating unit 204 converts the first profile into the second profile in Step S603 when the first video image is displayed in the display apparatus updating the display screen on the update cycle (at the first time interval) different from the reference update cycle (the second time interval).

The first video image results from the color correction process using the created profile for the video signal that is converted to display a video image on the acquired update cycle (at the first time interval) and is displayed in the display apparatus updating the display screen on the acquired update cycle.

The process of creating the created profile, performed by the profile creating unit 204, will be described below.

In Step 604 (a signal converting step), the color correction processing unit 203 converts the input video signal that is input to display a video image in the display apparatus updating the display screen on the reference update cycle into a video signal used for displaying a video image in the display apparatus updating the display screen on the acquired update cycle (at the first time interval).

The input video signal is input to display a video image in the display apparatus updating the display screen on the reference update cycle (at the second time interval).

In Step S604 (a processing step), the color correction processing unit 203 uses the created profile created in Step S603 to perform the color correction process to the converted video signal. The color correction processing unit 203 transmits the video signal resulting from the color correction process to the display apparatus.

In other words, the color correction processing unit 203 performs the color correction process using the second profile, which is used to display a video image in the display apparatus updating the display screen at the first time interval, to the video signal used for displaying a video image in the display apparatus updating the display screen at the first time interval in Step S604. The color correction processing unit 203 transmits the video signal resulting from the color correction process to the display apparatus updating the display screen at the first time interval to display the first video image in the display apparatus. The first time interval is the update cycle acquired by the time-interval acquiring unit 201, and the second profile is the created profile created by converting the detailed profile corresponding to the reference update cycle based on the acquired update cycle. As described above, the color correction processing unit 203 converts the input video signal that is input to display a video image at the second time interval into a video signal used for displaying a video image in the display apparatus updating the display screen at the first time interval.

The process of determining the simple profile used for the conversion of the detailed profile corresponding to the reference update cycle in Step S602, performed by the profile determining unit 202, the content of the simple profile, and the content of the detailed profile will now be described.

The profile determining unit 202 determines the simple profile used for the conversion of the detailed profile corresponding to the reference update cycle based on the update cycle acquired in Step S601. The profile determining unit 202 reads out the detailed profile corresponding to the reference update cycle. The profile determining unit 202, then, notifies the profile creating unit 204 of the determined simple profile and the detailed profile corresponding to the reference update cycle.

The simple profile determined by the profile determining unit 202 will now be described. The simple profile determined by the profile determining unit 202 is a destination profile described above in the first exemplary embodiment.

According to the second exemplary embodiment, the simple profile corresponding to a certain update cycle (for example, 5 ms) includes the value (for example, 5 ms) of a certain update cycle, a 3×3 matrix resulting from a combination of a 3×3 matrix used for converting XYZ tristimulus values into the RGB signal values corresponding to the update cycle (5 ms) and a 3×3 matrix used for converting XYZ tristimulus values into the RGB signal values corresponding to the reference update cycle, and the gamma characteristics of the RGB signal values of the display apparatus updating the display screen on the update cycle (5 ms). However, the structure of the simple profile is not restricted to the above one. It is possible to create the 3×3 matrix by measuring in advance the difference in luminance and color between the video image displayed on the reference update cycle and the video image displayed on another update cycle. The above information may be read out from another device.

The detailed profile according to the second exemplary embodiment includes the value (for example, 10 ms) of the reference update cycle and a three-dimensional table used for converting XYZ tristimulus values into the RGB signal values corresponding to the reference update cycle. The detailed profile also includes a 3×3 matrix used for converting the XYZ tristimulus values corresponding to the input video signal into the XdYdZd values corresponding to the color space of the display apparatus and the gamma characteristics of the RGB signal values of the display apparatus updating the display screen on the reference update cycle. An example of the three-dimensional table that is included in the detailed profile and that is used for converting the XYZ tristimulus values into the RGB signal values is shown in FIG. 7.

Figure 8:
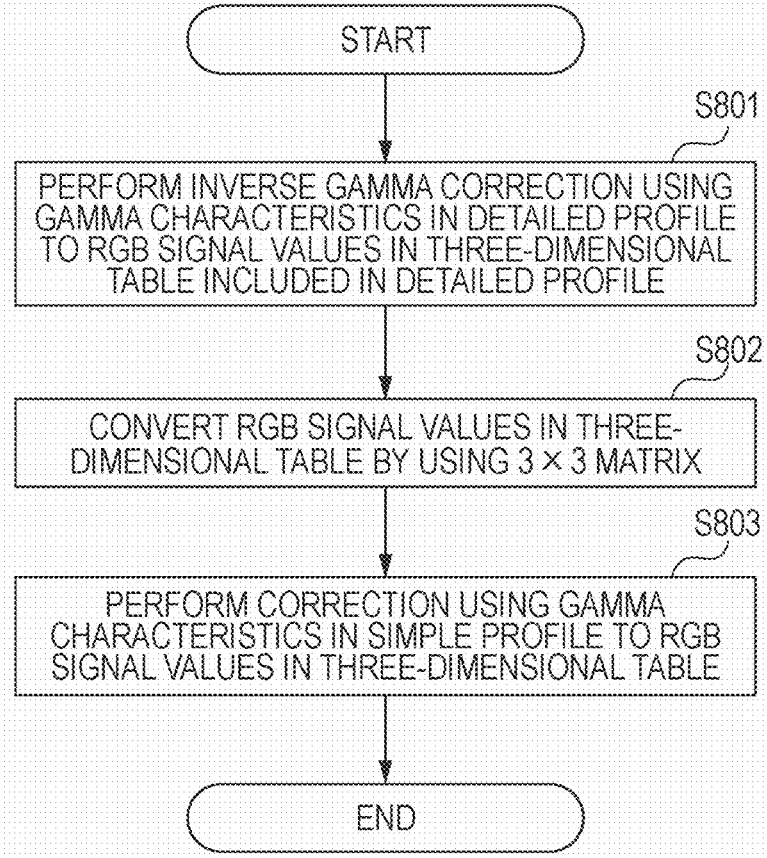
FIG. 8 is a flowchart showing an example of a process of creating a created profile.

FIG. 8 is a flowchart showing an example of the process of creating the created profile, performed by the profile creating unit 204. The process in FIG. 8 corresponds to Step S603 (the profile converting step) in FIG. 6.

Referring to FIG. 8, in Step S801, the profile creating unit 204 performs the inverse gamma correction using the gamma characteristics of the RGB signal values included in the detailed profile to the RGB signal values in the three-dimensional table in FIG. 7 to convert the RGB signal values into R'G'B' signal values. The conversion is performed according to Equation (2). The three-dimensional table is included in the detailed profile corresponding to the reference update cycle.

In Step S802, the profile creating unit 204 converts the R'G'B' signal values acquired in Step S801 into R"G"B" signal values, which are the RGB signal values corresponding to the acquired update cycle. The 3×3 matrix included in the simple profile determined in Step S602 is used in this conversion.

The content of the 3×3 matrix included in the simple profile and the method of converting the R'G'B' signal values into the R"G"B" signal values will now be described.

The R'G'B' signal values are RGB signal values resulting from the inverse gamma correction using the gamma characteristics in the detailed profile for the RGB signal values in the three-dimensional table included in the detailed profile corresponding to the reference update cycle. The R"G"B" signal values are RGB signal values that are converted so that the difference in luminance and color between the video image reproduced on the reference update cycle and the video image reproduced on the acquired update cycle is reduced. Specifically, the profile creating unit 204 converts the three-dimensional table in the detailed profile so that the RGB signal values converted from the XYZ tristimulus values are changed from the RGB signal values corresponding to the reference update cycle to the R"G"B" signal values corresponding to the acquired update cycle.

When the XYZ tristimulus values are converted into RGB signal values: Rcri, Gcri, and Bcri corresponding to the reference update cycle, Equation (6) is derived from Equation (4):

$$\begin{bmatrix} Rcri \\ Gcri \\ Bcri \end{bmatrix} = \begin{bmatrix} X_{Rcri} & X_{Gcri} & X_{Bcri} \\ Y_{Rcri} & Y_{Gcri} & Y_{Bcri} \\ Z_{Rcri} & Z_{Gcri} & Z_{Bcri} \end{bmatrix}^{-1} \cdot \begin{bmatrix} X \\ Y \\ Z \end{bmatrix} \quad (6)$$

When Equation (7) is given, $$Mcri = \begin{bmatrix} X_{Rcri} & X_{Gcri} & X_{Bcri} \\ Y_{Rcri} & Y_{Gcri} & Y_{Bcri} \\ Z_{Rcri} & Z_{Gcri} & Z_{Bcri} \end{bmatrix} \quad (7)$$

Equation (8) is derived from Equation (6):

$$\begin{bmatrix} Rcri \\ Gcri \\ Bcri \end{bmatrix} = Mcri^{-1} \cdot \begin{bmatrix} X \\ Y \\ Z \end{bmatrix} \quad (8)$$

When the XYZ tristimulus values are converted into RGB signal values: Rout, Gout, and Bout corresponding to the update cycle acquired by the time-interval acquiring unit 201, Equation (9) is derived Equation (8):

$$\begin{bmatrix} Rout \\ Gout \\ Bout \end{bmatrix} = Mout^{-1} \cdot \begin{bmatrix} X \\ Y \\ Z \end{bmatrix} \quad (9)$$

Rout, Gout, and Bout are calculated from Rcri, Bcri, and Bcri in the following manner. Equation (10) is derived from Equation (8):

$$Mcri^{-1} \cdot \begin{bmatrix} X \\ Y \\ Z \end{bmatrix} = \begin{bmatrix} Rcri \\ Gcri \\ Bcri \end{bmatrix} \quad (10)$$

Multiplication of both sides of Equation (10) by $Mout^{-1} \cdot Mcri$ results in:

$$Mout^{-1} \cdot Mcri \cdot Mcri^{-1} \cdot \begin{bmatrix} X \\ Y \\ Z \end{bmatrix} = Mout^{-1} \cdot Mcri \cdot \begin{bmatrix} Rcri \\ Gcri \\ Bcri \end{bmatrix} \quad (11)$$

Equation (12) is derived from Equation (11):

$$Mout^{-1} \cdot \begin{bmatrix} X \\ Y \\ Z \end{bmatrix} = Mout^{-1} \cdot Mcri \cdot \begin{bmatrix} Rcri \\ Gcri \\ Bcri \end{bmatrix} \quad (12)$$

Equation (13) is derived from Equation (12) according to Equation (9):

$$\begin{bmatrix} Rout \\ Gout \\ Bout \end{bmatrix} = Mout^{-1} \cdot Mcri \cdot \begin{bmatrix} Rcri \\ Gcri \\ Bcri \end{bmatrix} \quad (13)$$

The R'G'B' signal values acquired from the three-dimensional table in the detailed profile corresponding to the reference update cycle are represented by Rcri, Gcri, and Bcri. The R"G"B" signal values corresponding to the acquired update cycle are represented by Rout, Gout, and Bout. Accordingly, Equation (14) is derived from Equation (13):

$$\begin{bmatrix} R'' \\ G'' \\ B'' \end{bmatrix} = Mout^{-1} \cdot Mcri \cdot \begin{bmatrix} R' \\ G' \\ B' \end{bmatrix} \quad (14)$$

Equation (14) is the formula for converting R'G'B' signal values into R"G"B" signal values where the 3×3 matrix corresponds to $Mout^{-1} \cdot Mcri$.

The profile determining unit 202 stores the 3×3 matrix acquired in the above manner in advance. The 3×3 matrix results from a combination of the 3×3 matrix used for converting the XYZ tristimulus values into the RGB signal values corresponding to a certain update cycle (5 ms) and the 3×3 matrix used for converting the XYZ tristimulus values into the RGB signal values corresponding to the reference update cycle (10 ms). The 3×3 matrix resulting from the combination is calculated and stored for every update cycle.

The profile creating unit 204 uses the above 3×3 matrix notified by the profile determining unit 202 to convert the R'G'B' signal values into the R"G"B" signal values in Step S802.

In Step S803, the profile creating unit 204 performs the gamma correction using the RGB gamma characteristics in the simple profile to the R"G"B" signal values calculated in Step S802 to convert the R"G"B" signal values into R'''G'''B''' signal values. The conversion is performed according to Equation (5). The three-dimensional table in the detailed profile is converted from the one based on the reference update cycle into the one based on the acquired update cycle in the above manner.

The profile creating unit 204 replaces the reference update cycle in the detailed profile and the RGB gamma characteristics for the reference update cycle with the acquired update cycle and the RGB gamma characteristics for the acquired update cycle, respectively.

The profile creating unit 204 creates the created profile so as to correspond to the update cycle acquired by the time-interval acquiring unit 201 in the manner shown in FIG. 8. The profile creating unit 204 supplies the created profile to the color correction processing unit 203. The color correction processing unit 203 receives the created profile, converts the input video signal based on the acquired update cycle, and performs the color correction process, as in the first exemplary embodiment. The method of creating the created profile by the profile creating unit 204 is not restricted to the above one. For example, the profile creating unit 204 may store the detailed profiles of two update cycles and may create the created profile from the interpolation value between the detailed profiles.

As described above, the image processing apparatus 200 of the second exemplary embodiment creates the created profile corresponding to the update cycle of the display apparatus from the detailed profile corresponding to the reference update cycle and the simple profile for every update cycle set in the display apparatus. Specifically, the image processing apparatus 200 stores the detailed profile corresponding to the reference update cycle and the simple profile (the correction information) for every update cycle set in the display apparatus and creates the created profile corresponding to an update cycle that is acquired based on the acquired update cycle.

With the above method, it is possible to perform the color correction process corresponding to an update cycle for which the detailed profile is not provided even if a video image is reproduced on the update cycle. In addition, it is possible to reduce the amount of data, compared with a case where the detailed profiles corresponding to all the update cycles that can be set in the display apparatus are stored.

The detailed profile is converted by using the simple profile (the correction information) in the second exemplary embodiment. However, correction information, for example, a 3×3 matrix used for converting a video image resulting from the color correction process in accordance with the detailed profile corresponding to the reference update cycle may be stored, instead of the simple profile. Specifically, the profile determining unit 202 may store the correction information used for converting a video signal subjected to the color correction process for every update cycle set in the display apparatus and may determine the correction information used for converting the video signal based on an update cycle that is acquired. In this case, the color correction processing unit 203 converts the input video signal based on the acquired update cycle and performs the color correction process using the detailed profile corresponding to the reference update cycle to the video signal resulting from the conversion. The color correction processing unit 203, then, converts the video signal subjected to the color correction process into the output video signal corresponding to the acquired update cycle by using the correction information determined by the profile determining unit 202. Specifically, the time-interval acquiring unit 201 acquires an update cycle in Step S601. The profile determining unit 202 determines correction information used for converting a video signal subjected to the color correction process based on the acquired update cycle in Step S602. In addition, the profile determining unit 202 reads out the detailed profile corresponding to the reference update cycle in Step S602. The profile determining unit 202 notifies the color correction processing unit 203 of the correction information and the detailed profile.

The color correction processing unit 203 converts the input video signal based on the acquired update cycle and performs the color correction process using the detailed profile corresponding to the reference update cycle to the video signal resulting from the conversion in Step S603. In addition, the color correction processing unit 203 converts the video signal subjected to the color correction process by using the correction information notified by the profile determining unit 202 in Step S603.

The color correction processing unit 203 transmits the video signal subjected to the color correction process to the display apparatus as the output video signal in Step S604.

In other words, the profile creating unit 204 converts the video signal subjected to the color correction process based on the correction information when the first video image is displayed in the display apparatus that updates the display screen on the update cycle (at the first time interval) different from the reference update cycle (the second time interval) corresponding to the input video signal. The color correction process is performed by using the detailed profile corresponding to the reference update cycle (the second time interval).

The conversion of the video signal based on the correction information is performed so that the difference between the first and second video images becomes smaller than the difference between the third and second video images. According to the second exemplary embodiment, the first video image is generated in a manner in which an input video signal is converted to display a video image on an update cycle that is acquired (at the first time interval), the video signal resulting from the conversion is subjected to the color correction process using the detailed profile corresponding to the reference update cycle, and the video signal is converted by using the correction information. The first video image is displayed in the display apparatus updating the display screen on the acquired update cycle (at the first time interval). The second video image results from the color correction process using the detailed profile corresponding to the reference update cycle for an input video signal used for displaying a video image on the reference update cycle (at the second time interval) and is displayed in the display apparatus updating the display screen on the reference update cycle (at the second time interval). The third video image results from the color correction process using the detailed profile corresponding to the reference update cycle for an input video signal used for displaying a video image on the reference update cycle (at the second time interval) and is displayed in the display apparatus updating the display screen on the update cycle different from the reference update cycle (at the first time interval). The second and third video images correspond to the output video signal that is subjected to the color correction process using the detailed profile corresponding to the reference update cycle and that is output without conversion. The first and third video images are displayed in the display apparatus updating the display screen on the acquired update cycle (at the first time interval).

The profile determining unit 202 may store, for example, the 3×3 matrix used for converting the video signal subjected to the color correction process using the detailed profile corresponding to the reference update cycle for every update cycle so that the above conditions are satisfied.

It is possible to generate the correction information by measuring in advance the difference in luminance and color between the video image reproduced on the reference update cycle corresponding to the input video signal and the video image reproduced on another update cycle. Specifically, the video image reproduced on the reference update cycle (for example, 10 ms) is compared with the video image reproduced on another update cycle (for example, 5 ms). Then, the correction information used for converting the video signal subjected to the color correction process is generated so that the difference in luminance and color between the video image reproduced on the other update cycle and the video image reproduced on the reference update cycle becomes small. The profile determining unit 202 may store the multiple pieces of correction information corresponding to the multiple update cycles, which have been generated in advance in the above manner. However, the image processing apparatus 200 may read out the above correction information from another apparatus and may store the readout correction information.

Alternatively, correction information used for converting a video signal before the color correction process may be used. The color correction processing unit 203 may convert a video signal before the color correction process by using the correction information selected by the profile determining unit 202 and may perform the color correction process using the detailed profile corresponding to the reference update cycle to the video signal resulting from the conversion.

Specifically, the time-interval acquiring unit 201 acquires an update cycle in Step S601. The profile determining unit 202 determines correction information used for converting a video signal before the color correction process based on the acquired update cycle in Step S602. In addition, the profile determining unit 202 reads out the detailed profile corresponding to the reference update cycle in Step S602. The profile determining unit 202 notifies the color correction processing unit 203 of the correction information and the detailed profile corresponding to the reference update cycle. The color correction processing unit 203 converts the input video signal into a video signal corresponding to the acquired update cycle in Step S603. In addition, the color correction processing unit 203 converts the video signal before the color correction process by using the correction information notified by the profile determining unit 202 in Step S603. The color correction processing unit 203 performs the color correction process using the detailed profile corresponding to the reference update cycle to the video signal resulting from the conversion in Step S604 and transmits the output video signal to the display apparatus.

In other words, the color correction processing unit 203 converts the input video signal based on the first time interval in Step S603 when the first video image is displayed in the display apparatus that updates the display screen on the update cycle (at the first time interval) different from the reference update cycle (the second time interval). The color correction processing unit 203 converts the video signal before the color correction process based on the correction information. The color correction processing unit 203 performs the color correction process using the detailed profile corresponding to the reference update cycle (the second time interval) to the video signal resulting from the conversion using the correction information. The conversion of the video signal based on the correction information is performed so that the difference between the first and second video images becomes smaller than the difference between the third and second video images. According to the second exemplary embodiment, the first video image is generated in the manner in which an input video signal is converted to display a video image on an update cycle that is acquired (at the first time interval), the video signal resulting from the conversion is converted by using the correction information, and the video signal resulting from the conversion is subjected to the color correction process using the detailed profile corresponding to the reference update cycle. The first video image is displayed in the display apparatus updating the display screen on the acquired update cycle (at the first time interval).

The profile determining unit 202 may store, for example, the 3×3 matrix used for converting the video signal for every update cycle as the correction information so that the above conditions are satisfied.

It is possible to generate the correction information by measuring in advance the difference in luminance and color between the video image reproduced on the reference update cycle and the video image reproduced on another update cycle. Specifically, the video image reproduced on the reference update cycle (for example, 10 ms) corresponding to the input video signal is compared with the video image reproduced on another update cycle (for example, 5 ms). Then, the correction information used for converting the video signal before the color correction process is generated so that the difference in luminance and color between the video image reproduced on the other update cycle and the video image reproduced on the reference update cycle becomes small. The profile determining unit 202 may store the multiple pieces of correction information corresponding to the multiple update cycles, which have been generated in advance in the above manner. However, the image processing apparatus 200 may read out the above correction information from another apparatus and may store the readout correction information.

Also with the above method, it is possible to reduce the variation of the video image due to different time intervals at which the display screen is updated.

Although the example in which the detailed profile corresponding to the reference update cycle, the video signal before the color correction process, or the video signal subjected to the color correction process is converted based on the acquired update cycle is described in the second exemplary embodiment, the vertical synchronizing frequency may be acquired, as described above. Specifically, the profile determining unit 202 may convert the detailed profile, the video signal before the color correction process, or the video signal subjected to the color correction process based on the vertical synchronizing frequency acquired by the time-interval acquiring unit 201. In this case, the profile determining unit 202 stores the multiple simple profiles (the multiple pieces of correction information) corresponding to the vertical synchronizing frequencies.

Although the examples of the RGB signal values and XYZ tristimulus values are described above, CMYK values or Lab values are applicable to the embodiments of the present invention.

The examples in which the variation in luminance and color due to different vertical synchronizing frequencies (different update cycles of the display screen) set in the display apparatus is reduced are described above. However, the variation in luminance or color due to different vertical synchronizing frequencies (different update cycles of the display screen) may be reduced.

The present invention can be embodied by supplying a computer-readable storage medium storing program code (software) realizing the functions according to the above exemplary embodiments to a system or an apparatus, the computer (or central processing unit (CPU) or micro processing unit (MPU)) in which system or apparatus reads out and executes the program code stored on the computer-readable storage medium. In this case, the program code read out from the computer-readable storage medium realizes the functions according to the above exemplary embodiments. The present invention is applicable to the computer-readable storage medium storing the program code.

The computer-readable storage medium supplying the program code may be, for example, a flexible disk, a hard disk, an optical disk, a magneto-optical disk, a compact disk-read only memory (CD-ROM), a compact disk-recordable (CD-R), a magnetic tape, a nonvolatile memory card, or a digital versatile disk (DVD).

In addition, the operating system (OS) or the like running on the computer may execute all or part of the actual processing based on instructions in the program code to realize the functions of the exemplary embodiments described above.

Alternatively, after the program code read out from the computer-readable storage medium is written in a memory that is provided in a function expansion board included in the computer or in a function expansion unit connected to the computer, the CPU or the like in the function expansion board or the function expansion unit may execute all or part of the actual processing based on instructions in the program code to realize the functions of the exemplary embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-180225 filed Jul. 10, 2008, which is hereby incorporated by reference herein in its entirety.

What is claimed is:

1. An image processing apparatus that performs a color correction process to a video signal and outputs the video signal subjected to the color correction process to a display apparatus, the image processing apparatus comprising:
    an acquiring unit configured to acquire a frequency at which the display screen is updated;
    a determining unit configured to determine a profile used for a first color correction process such that, in a case where an acquired vertical synchronizing frequency is different from a predetermined frequency, a difference between a first luminance and a second luminance becomes smaller than a difference between a third luminance and the second luminance, wherein the first luminance is a luminance of a video signal subjected to the first color correction process and displayed on a first display apparatus updating a display screen at the acquired vertical synchronizing frequency, the second luminance is a luminance of a video signal subjected to a second color correction process using a predetermined profile and displayed on a second display apparatus updating a display screen at a predetermined vertical synchronizing frequency, and the third luminance is a luminance of a video signal without being subjected to a color correction process and displayed on the first display apparatus for updating the display screen at the acquired vertical synchronizing frequency; and
    a processing unit configured to perform the first color correction process using the determined profile to the video signal.

2. The image processing apparatus according to claim 1, wherein the acquiring unit acquires the frequency at which the display screen is updated by measuring a frequency between frequencies when a voltage that is applied to display a video image in the display screen exceeds a threshold value.

3. The image processing apparatus according to claim 2, wherein the acquiring unit measures the frequencies between the frequencies when the applied voltage exceeds the threshold value at multiple display positions on the display screen.

4. The image processing apparatus according to claim 3, wherein the acquiring unit selects the multiple display positions based on luminance information.

5. The image processing apparatus according to claim 2, wherein the acquiring unit measures multiple frequencies between the frequencies when the applied voltage exceeds the threshold value and acquires the shortest frequency, among the frequencies between the frequencies when the applied voltage exceeds the threshold value, as the frequency at which the display screen is updated.

6. An image processing method for an image processing apparatus that performs a color correction process to a video signal and outputs the video signal subjected to the color correction process to a display apparatus, the image processing method comprising:
    a processor for acquiring a frequency at which the display screen is updated;
    determining a profile used for a first color correction process such that, in a case where an acquired vertical synchronizing frequency is different from a predetermined vertical synchronizing frequency, a difference between a first luminance and a second luminance becomes smaller than a difference between a third luminance and the second luminance, wherein the first luminance is a luminance of a video signal subjected to the first color correction process and displayed on a first display apparatus updating a display screen at the acquired vertical synchronizing frequency, the second luminance is a luminance of a video signal subjected to a second color correction process using a predetermined profile and displayed on a second display apparatus updating a display screen at a predetermined vertical synchronizing frequency, and the third luminance is a luminance of a video signal without being subjected to a color correction process and displayed on the first display apparatus for updating the display screen at the acquired vertical synchronizing frequency; and performing the first color correction process using the determined profile to the video signal.

7. The image processing method according to claim 6, wherein the acquiring step acquires the frequency at which the display screen is updated by measuring a frequency between frequencies when a voltage that is applied to display a video image in the display screen exceeds a threshold value.

8. The image processing method according to claim 7, wherein the acquiring step measures the frequencies between the frequencies when the applied voltage exceeds the threshold value at multiple display positions on the display screen.

9. The image processing method according to claim 8, wherein the acquiring step selects the multiple display positions based on luminance information.

10. The image processing method according to claim 7, wherein the acquiring step measures multiple frequencies between the frequencies when the applied voltage exceeds the threshold value and acquires the shortest frequency, among the frequencies between the frequencies when the applied voltage exceeds the threshold value, as the frequency at which the display screen is updated.

11. A non-transitory computer-readable storage medium storing a program that performs a color correction process to a video signal and outputs the video signal subjected to the color correction process to a display apparatus, the program comprising:

acquiring a vertical synchronizing frequency at which the display screen is updated;

determining a profile used for a first color correction process such that, in a case where an acquired vertical synchronizing frequency is different from a predetermined vertical synchronizing frequency, a difference between a first luminance and a second luminance becomes smaller than a difference between a third luminance and the second luminance, wherein the first luminance is a luminance of a video signal subjected to the first color correction process and displayed on a first display apparatus updating a display screen at the acquired vertical synchronizing frequency, the second luminance is a luminance of a video signal subjected to a second color correction process using a predetermined profile and displayed on a second display apparatus updating a display screen at a predetermined vertical synchronizing frequency, and the third luminance is a luminance of a video signal without being subjected to a color correction process and displayed on the first display apparatus for updating the display screen at the acquired vertical synchronizing frequency; and performing the first color correction process using the determined profile to the video signal.

12. An image processing apparatus that performs a color correction process to a video signal and outputs the video signal subjected to the color correction process to a display apparatus, the image processing apparatus comprising:

an acquiring unit configured to acquire a first time interval which is set in a first display apparatus and at which a display screen of the first display is updated;

a storage unit configured to store a profile used for the color correction process for a video signal for displaying a video image in a second display apparatus updating a display screen at a second time interval;

a converting unit configured to convert a video signal so that the difference between a first luminance and a second luminance becomes smaller than the difference between the second luminance and a third luminance, wherein the first luminance is a luminance of a video signal to be subjected to a color correction process using the stored profile and to be displayed on the first display apparatus, the second luminance is a luminance of a video signal subjected to a color correction process using the stored profile and displayed on the second display apparatus, and the third luminance is a luminance of a video signal without being subjected to color a correction process and displayed on the first display apparatus; and a processing unit configured to perform the color correction process using the stored profile to the video signal converted by the converting unit and to output the video signal subjected to the color correction process to the first display apparatus updating the display screen at the first time interval.

13. The image processing apparatus according to claim 12, wherein the acquiring unit acquires a third time interval included in the video signal, and wherein the converting unit converts the video signal if the second time interval is different from the third time interval.

14. An image processing apparatus that performs a color correction process to a video signal and transmits the video signal subjected to the color correction process to a display apparatus, the image processing apparatus comprising:

an acquiring unit configured to acquire a first time interval which is set in a first display apparatus and at which a display screen of the first display apparatus is updated;

a storage unit configured to store a first profile used for displaying a video image in a second display apparatus updating the display screen at a second time interval;

a signal converting unit configured to convert a video signal that is input to display a video image in the second display apparatus into a video signal that is input to display a video image in the first display apparatus;

a profile converting unit configured to convert the first profile into a second profile used for displaying a video image in the first display apparatus so that the difference between a first luminance and a second luminance becomes smaller than the difference between the second luminance and a third luminance, wherein the first luminance is a luminance of a video signal to be subjected to a color correction process using the second profile and to be displayed on the first display apparatus, the second luminance is a luminance of a video signal subjected to a color correction process using the first profile and displayed on the second display apparatus, and the third luminance is a video signal without subjected to color a correction process and displayed on the first display apparatus; and a processing unit configured to perform the color correction process using the second profile to the video signal for displaying a video image in the first display apparatus.

15. An image processing method for an image processing apparatus that performs a color correction process to a video signal and outputs the video signal subjected to the color correction process to a display apparatus, the image processing method comprising:

a memory;

a processor coupled to the memory which executes the following:

acquiring a first time interval which is set in a first display apparatus and at which a display screen of the first display is updated;

reading out a profile used for the color correction process for a video signal for displaying a video image in a second display apparatus updating a display screen at a second time interval;

converting a video signal so that the difference between a first luminance and a second luminance becomes smaller than the difference between the second luminance and a third luminance, wherein the first luminance is a luminance of a video signal to be subjected to a color correction process using the stored profile and to be displayed on the first display apparatus, the second luminance is a luminance of a video signal subjected to a color correction process using the stored profile and displayed on the second display apparatus, and the third luminance is a luminance of a video signal without being subjected to color a correction process and displayed on the first display apparatus; and performing the color correction process using the stored profile to the video signal resulting from the conversion and outputting the video signal subjected to the color correction process to the first display apparatus updating the display screen at the first time interval.

16. The image processing method according to claim 15, wherein the acquiring step acquires a third time interval included in the video signal, and wherein the converting step converts the video signal if the second time interval is different from the third time interval.

17. A non-transitory computer-readable storage medium storing a program that performs a color correction process to a video signal and outputs the video signal subjected to the color correction process to a display apparatus, the program comprising:

acquiring a first time interval which is set in a first display apparatus and at which a display screen of the first display is updated;

reading out a profile used for the color correction process for a video signal for displaying a video image in a second display apparatus updating a display screen at a second time interval;

converting a video signal so that the difference between a first luminance and a second luminance becomes smaller than the difference between the second luminance and a third luminance, wherein the first luminance is a luminance of a video signal to be subjected to a color correction process using the stored profile and to be displayed on the first display apparatus, the second luminance is a luminance of a video signal subjected to a color correction process using the stored profile and displayed on the second display apparatus, and the third luminance is a luminance of a video signal without being subjected to color a correction process and displayed on the first display apparatus; and performing the color correction process using the stored profile to the video signal resulting from the conversion and outputting the video signal subjected to the color correction process to the first display apparatus updating the display screen at the first time interval.

18. An image processing method for an image processing apparatus that performs a color correction process to a video signal and outputs the video signal subjected to the color correction process to a display apparatus, the image processing method comprising:

a memory;

a processor coupled to the memory which executes the following:

acquiring a first time interval which is set in a first display apparatus and at which a display screen of the first display apparatus is updated;

reading out a first profile used for displaying a video image in a second display apparatus updating the display screen at a second time interval;

converting a video signal that is input to display a video image in the second display apparatus into a video signal that is input to display a video image in the first display apparatus;

converting the first profile into a second profile used for displaying a video image in the first display apparatus so that the difference between a first luminance and a second luminance becomes smaller than the difference between the second luminance and a third luminance, wherein the first luminance is a luminance of a video signal to be subjected to a color correction process using the second profile and to be displayed on the first display apparatus, the second luminance is a luminance of a video signal subjected to a color correction process using the first profile and displayed on the second display apparatus, and the third luminance is a video signal without being subjected to color a correction process and displayed on the first display apparatus; and performing the color correction process using the second profile to the video signal for displaying a video image in the first display apparatus.

19. A non-transitory computer-readable storage medium storing a program that performs a color correction process to a video signal and outputs the video signal subjected to the color correction process to a display apparatus, the program comprising:

acquiring a first time interval which is set in a first display apparatus and at which a display screen of the first display apparatus is updated;

reading out a first profile used for displaying a video image in a second display apparatus updating the display screen at a second time interval;

converting a video signal that is input to display a video image in the second display apparatus into a video signal for displaying a video image in the first display apparatus;

converting the first profile into a second profile used for displaying a video image in the first display apparatus so that the difference between a first luminance and a second luminance becomes smaller than the difference between the second luminance and a third luminance, wherein the first luminance is a luminance of a video signal to be subjected to a color correction process using the second profile and to be displayed on the first display apparatus, the second luminance is a luminance of a video signal subjected to a color correction process using the first profile and displayed on the second display apparatus, and the third luminance is a video signal without subjected to color a correction process and displayed on the first display apparatus; and performing the color correction process using the second profile to the video signal for displaying a video image in the first display apparatus.

* * * * *